United States Patent
Zhong et al.

(10) Patent No.: US 10,627,536 B2
(45) Date of Patent: *Apr. 21, 2020

(54) REAL AND IMAGINARY COMPONENTS OF ELECTROMAGNETIC LOGGING MEASUREMENTS

(71) Applicant: Schlumberger Technology Corporation, Sugar Land, TX (US)

(72) Inventors: Helen Xiaoyan Zhong, Sugar Land, TX (US); Mark T. Frey, Sugar Land, TX (US); Peter T. Wu, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/773,638

(22) PCT Filed: Oct. 14, 2016

(86) PCT No.: PCT/US2016/056945
§ 371 (c)(1),
(2) Date: May 4, 2018

(87) PCT Pub. No.: WO2017/078916
PCT Pub. Date: May 11, 2017

(65) Prior Publication Data
US 2018/0321413 A1     Nov. 8, 2018

Related U.S. Application Data

(60) Provisional application No. 62/250,662, filed on Nov. 4, 2015.

(51) Int. Cl.
*G01V 3/28* (2006.01)
*G01V 3/18* (2006.01)
(Continued)

(52) U.S. Cl.
CPC .......... *G01V 3/28* (2013.01); *G01V 3/18* (2013.01); *G01V 3/26* (2013.01); *G01V 3/38* (2013.01)

(58) Field of Classification Search
CPC ... G01V 3/28; G01V 3/26; G01V 3/30; G01V 3/38; G01V 3/18; G01V 5/125;
(Continued)

(56) References Cited

U.S. PATENT DOCUMENTS 5,682,099 A * 10/1997 Thompson ............... G01V 3/30
324/338
5,811,973 A    9/1998 Meyer, Jr.
(Continued)

FOREIGN PATENT DOCUMENTS

CN      103352696 A      10/2013
WO      WO2008137987 A1  11/2008
(Continued)

OTHER PUBLICATIONS

International Search Report and Written Opinion issued in International Patent application PCT/US2016/056940, dated Jan. 24, 2017. 16 pages.
(Continued)

*Primary Examiner* — Vinh P Nguyen

(57) ABSTRACT

A method for making gain compensated electromagnetic logging measurements of a subterranean formation includes rotating an electromagnetic logging tool in a subterranean wellbore. The logging tool includes a transmitter having at least one transmitting antenna axially spaced apart from a receiver having at least one receiving antenna. Electromagnetic waves are transmitted into the subterranean wellbore using the at least one transmitting antenna. Voltage measurements corresponding to the transmitted electromagnetic waves are received at the receiving antenna. The voltage
(Continued)

measurements are processed to compute real and imaginary directional resistivity measurement quantities.

17 Claims, 12 Drawing Sheets

(51) Int. Cl.
*G01V 3/26* (2006.01)
*G01V 3/38* (2006.01)

(58) Field of Classification Search
CPC ........ G01V 13/00; G01V 99/005; G01V 1/04;
G01V 1/306; G01V 1/46; G01V 1/50;
G01V 3/083; G01V 3/12; G01V 3/20;
G01V 3/24; G01V 3/34; E21B 47/02216;
E21B 47/12; E21B 49/00; E21B 43/26;
E21B 47/122; E21B 7/068; E21B 47/024;
E21B 47/082; E21B 47/0905; E21B
47/124; E21B 2041/0028; E21B 34/14;
E21B 43/12; E21B 43/32; E21B 47/08;
E21B 47/16; E21B 47/18; G06F 17/16;
G01R 13/02; H04L 27/3854
See application file for complete search history.

(56) References Cited

U.S. PATENT DOCUMENTS

| | | | |
|---|---|---|---|
| 7,863,901 B2 | 1/2011 | Seleznev et al. | |
| 7,991,555 B2 | 8/2011 | Yang et al. | |
| 8,466,683 B2 | 6/2013 | Legendre et al. | |
| 9,448,324 B2 | 9/2016 | Frey | |
| 9,541,666 B2 | 1/2017 | Frey | |
| 9,581,721 B2 | 2/2017 | Frey | |
| 9,618,647 B2 | 4/2017 | Frey | |
| 9,784,880 B2 | 10/2017 | Frey | |
| 9,804,292 B2 | 10/2017 | Bertrand et al. | |
| 9,933,541 B2* | 4/2018 | Yang | G01V 3/28 |
| 10,302,805 B2 | 5/2019 | Frey | |
| 2010/0127708 A1 | 5/2010 | Bittar | |
| 2011/0074427 A1 | 3/2011 | Wang et al. | |
| 2011/0166842 A1 | 7/2011 | Banning-Geertsma et al. | |
| 2011/0238312 A1 | 9/2011 | Seydoux et al. | |
| 2011/0291855 A1 | 12/2011 | Homan et al. | |
| 2011/0309833 A1 | 12/2011 | Yang | |
| 2013/0073206 A1 | 3/2013 | Hou et al. | |
| 2015/0276967 A1 | 10/2015 | Frey | |
| 2015/0276968 A1 | 10/2015 | Frey | |
| 2015/0276973 A1 | 10/2015 | Frey | |
| 2017/0075024 A1* | 3/2017 | Wu | G01V 3/30 |
| 2018/0321414 A1* | 11/2018 | Wu | G01V 3/18 |

FOREIGN PATENT DOCUMENTS

| | | |
|---|---|---|
| WO | WO2014011190 A1 | 1/2014 |
| WO | WO2015027002 A1 | 2/2015 |
| WO | WO2015027010 A1 | 2/2015 |

OTHER PUBLICATIONS

International Search Report and Written Opinion issued in International Patent application PCT/US2016/056945, dated Oct. 16, 2014. 14 pages.
First Office Action and Search Report issued in Chinese Patent Application 201680066656.0 dated Jul. 25, 2019, 17 pages.
Office Action issued in U.S. Appl. No. 15/773,818 dated Oct. 3, 2019, 10 pages.

* cited by examiner

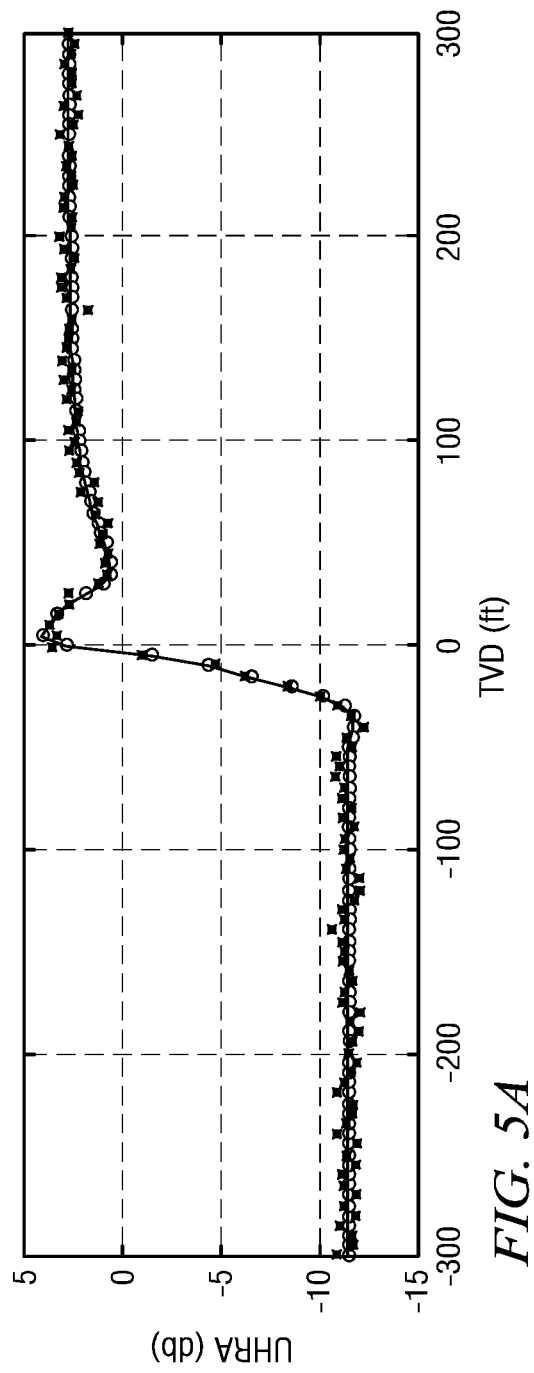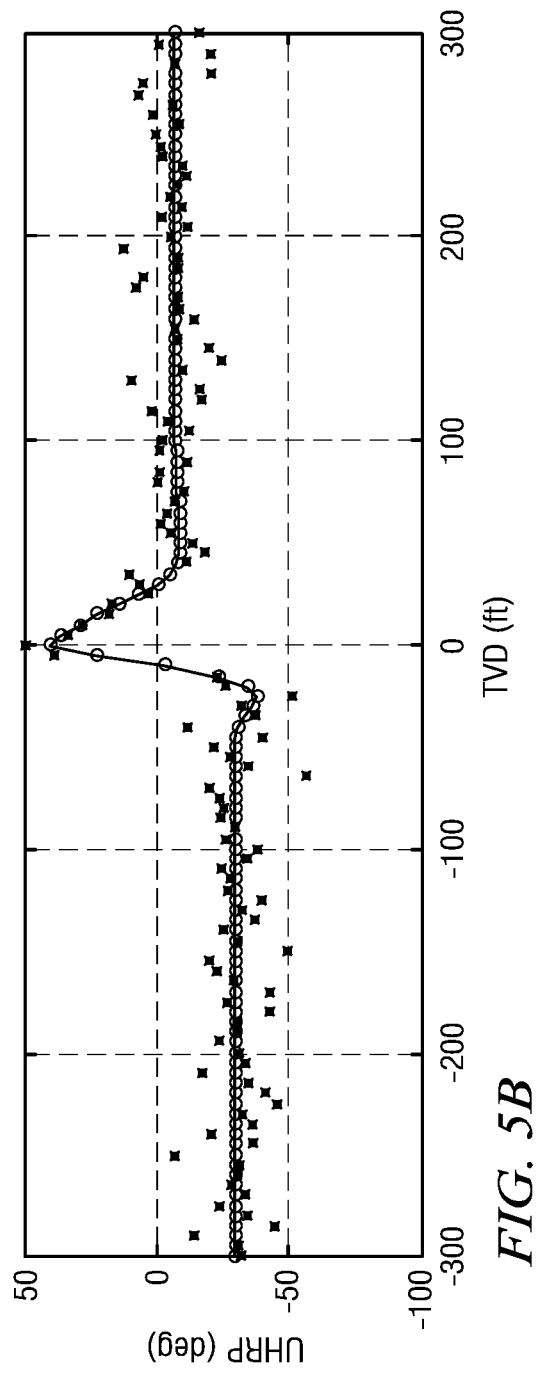
FIG. 5A
FIG. 5B

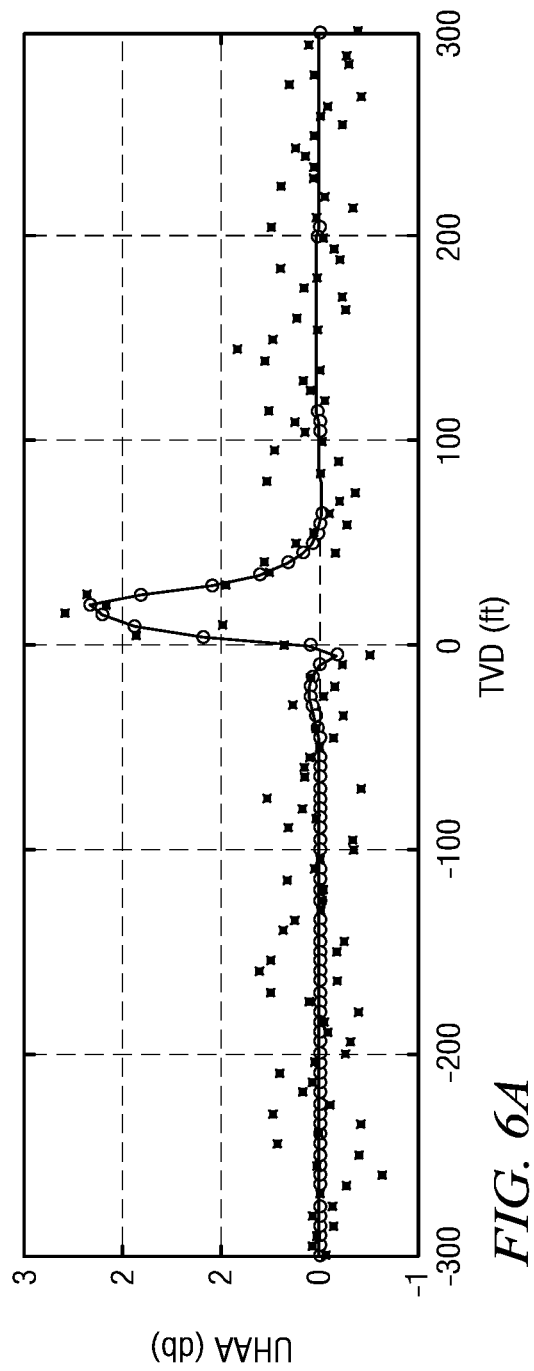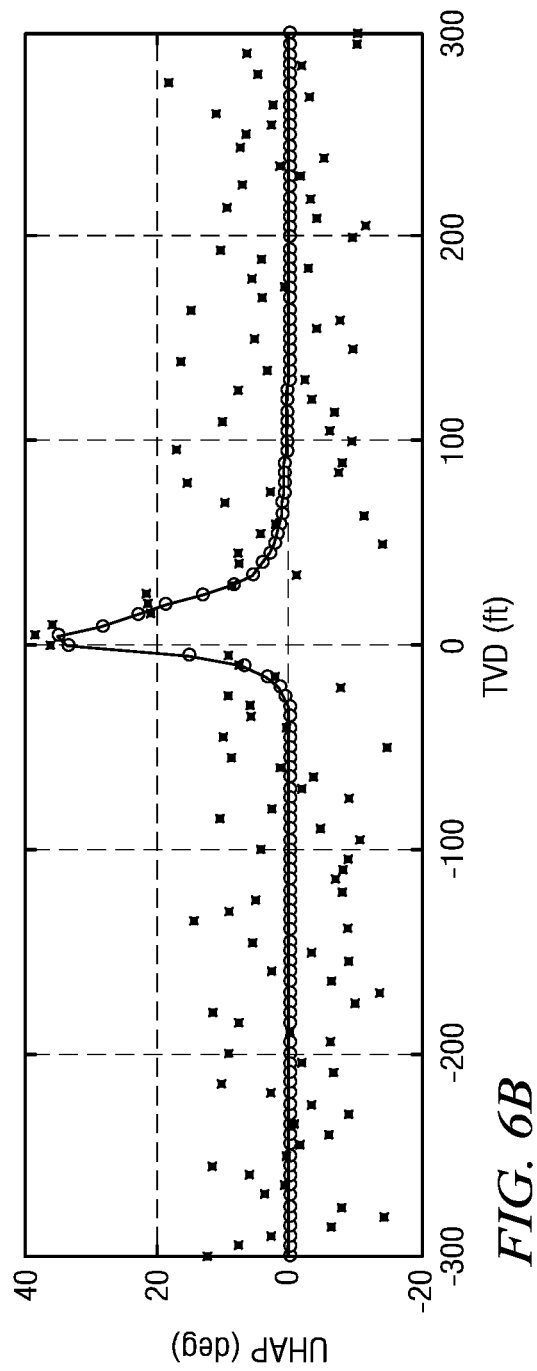
FIG. 6A
FIG. 6B

REAL AND IMAGINARY COMPONENTS OF ELECTROMAGNETIC LOGGING MEASUREMENTS

CROSS REFERENCE TO RELATED APPLICATIONS

The present application is the U.S. national phase of International Patent Application No. PCT/US2016/056945, filed Oct. 14, 2016, and entitled "Real and Imaginary Components of Electromagnetic Logging Measurements," which claims priority to U.S. Provisional Application 62/250,662 filed Nov. 4, 2015, the entirety of which is incorporated by reference.

FIELD OF THE INVENTION

Disclosed embodiments relate generally to downhole electromagnetic logging methods and more particularly to a logging tool and methods for computing real and imaginary components of electromagnetic logging measurements.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed, e.g., in pay-zone steering applications, to provide information upon which steering decisions may be made.

Directional resistivity measurements are generally complex quantities, containing information about the signal attenuation and phase shift induced by the external environment (e.g., the subterranean formation). As such, directional resistivity measurements are commonly processed to compute a corresponding attenuation and phase shift. While such measurements are useful there remains room for further improvement, particularly in noisy measurement environments employing gain compensation.

SUMMARY

A method for making gain compensated electromagnetic logging measurements of a subterranean formation is disclosed. An electromagnetic logging tool is rotated in a subterranean wellbore. The logging tool includes a transmitter having at least one transmitting antenna axially spaced apart from a receiver having at least one receiving antenna. Electromagnetic waves are transmitted into the subterranean formation using the at least one transmitting antenna. Voltage measurements corresponding to the transmitted electromagnetic waves are received at the receiving antenna. The voltage measurements are processed to compute real and imaginary directional resistivity measurements such as gain compensated, real and imaginary, symmetrized and antisymmetrized measurement quantities.

The disclosed embodiments may provide various technical advantages. For example, the disclosed methodology may provide electromagnetic measurement quantities that are highly robust to both systematic and incoherent random noise. Such measurements thus may provide for more accurate inversion for subterranean formation properties.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 5A and 5B depict harmonic resistivity attenuation (FIG. 5A) and phase shift (FIG. 5B) measurements computed using Equations 24 and 28.

FIGS. 6A and 6B depict harmonic anisotropy attenuation (FIG. 6A) and phase shift (FIG. 6B) measurements computed using Equations 25 and 28.

DETAILED DESCRIPTION

Figure 1:
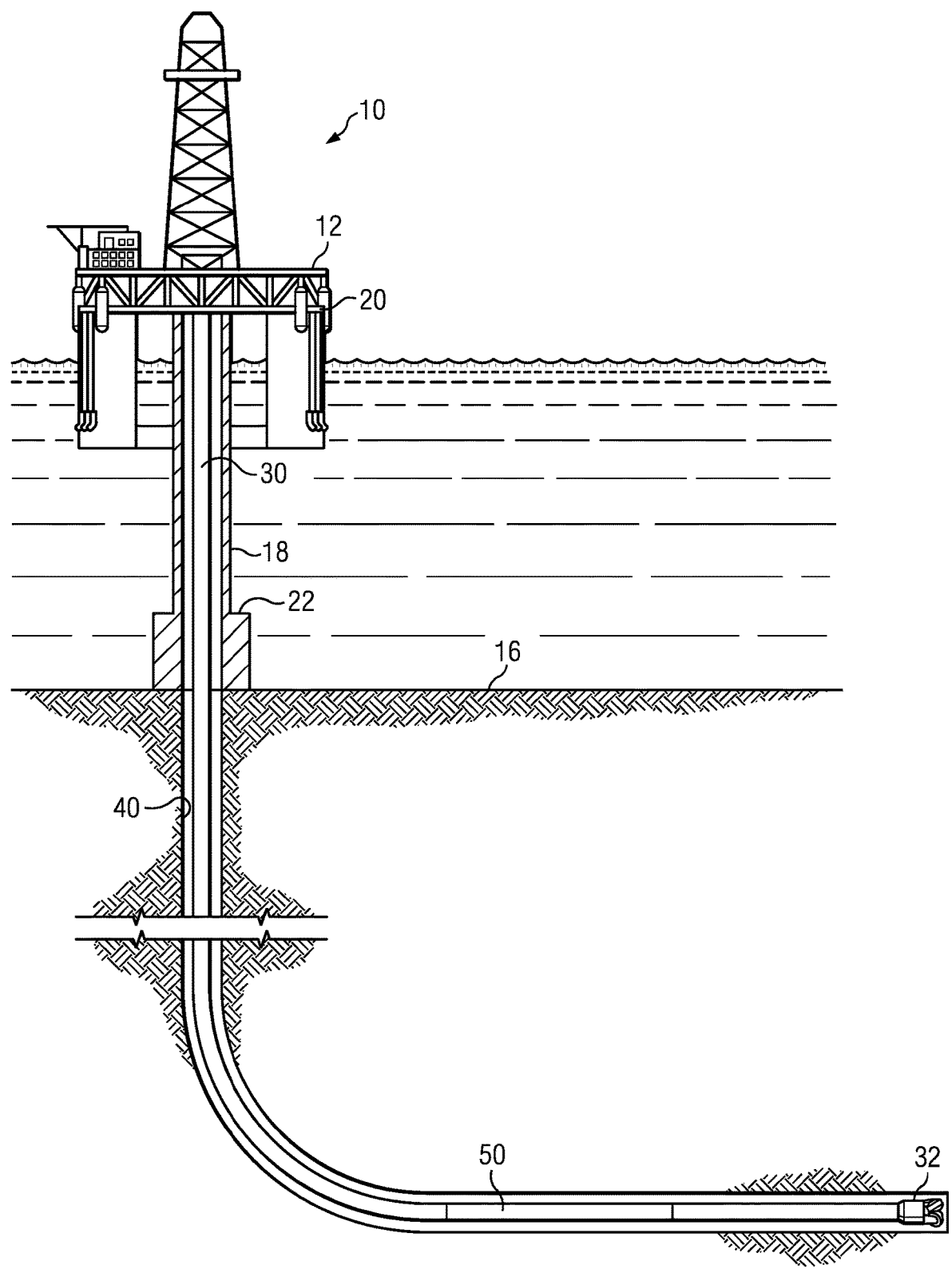
FIG. 1 depicts one example of a drilling rig on which the disclosed electromagnetic logging methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 configured to make directional electromagnetic logging measurements. As described in more detail below the electromagnetic measurement tool 50 may include multi-axial antennas deployed on a logging while drilling tool body.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

Figure 2A:
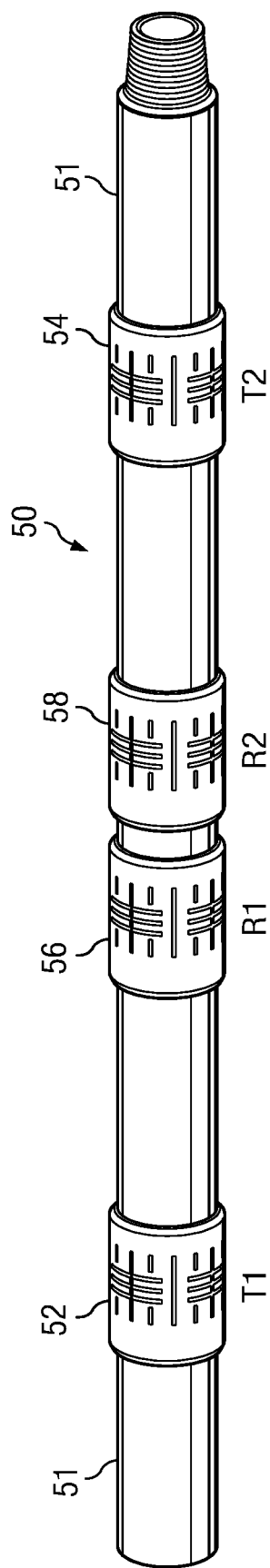
FIG. 2A depicts one example of the electromagnetic logging tool shown on FIG. 1.

FIG. 2A depicts one example of an electromagnetic measurement tool 50. In the depicted embodiment measurement tool 50 includes first and second axially spaced transmitters 52 and 54 and first and second axially spaced receivers 56 and 58 deployed on a logging while drilling tool body 51, with the receivers 56 and 58 being deployed axially between the transmitters 52 and 54. To obtain directional measurements, each of the transmitters 52 and 54 and receivers 56 and 58 generally includes at least one transverse antenna and may further include an axial antenna. For example, the transmitters and receivers may include a bi-axial antenna arrangement including an axial antenna and a transverse (cross-axial) antenna. In another embodiment, the transmitters and receivers may include a tri-axial antenna arrangement including an axial antenna and first and second transverse antennas that are orthogonal to one another. As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein).

Figure 2B:
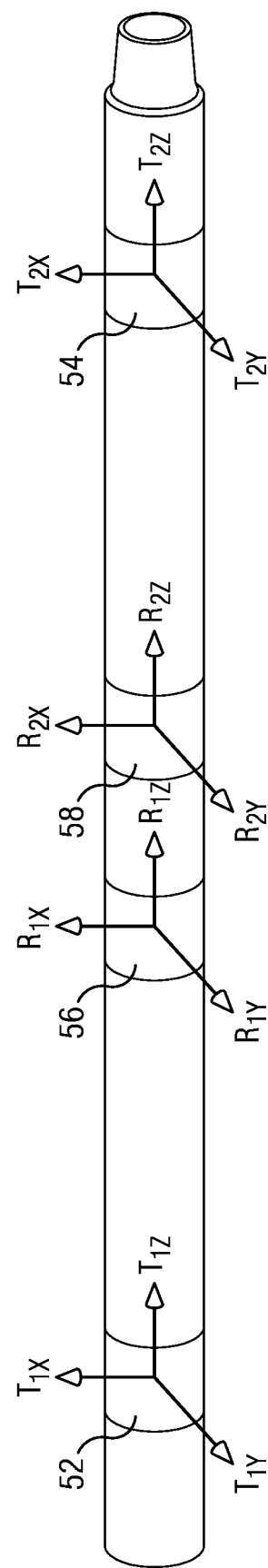
FIG. 2B schematically depicts the antenna moments in an electromagnetic logging tool including triaxial transmitters and receivers.
Figure 2C:
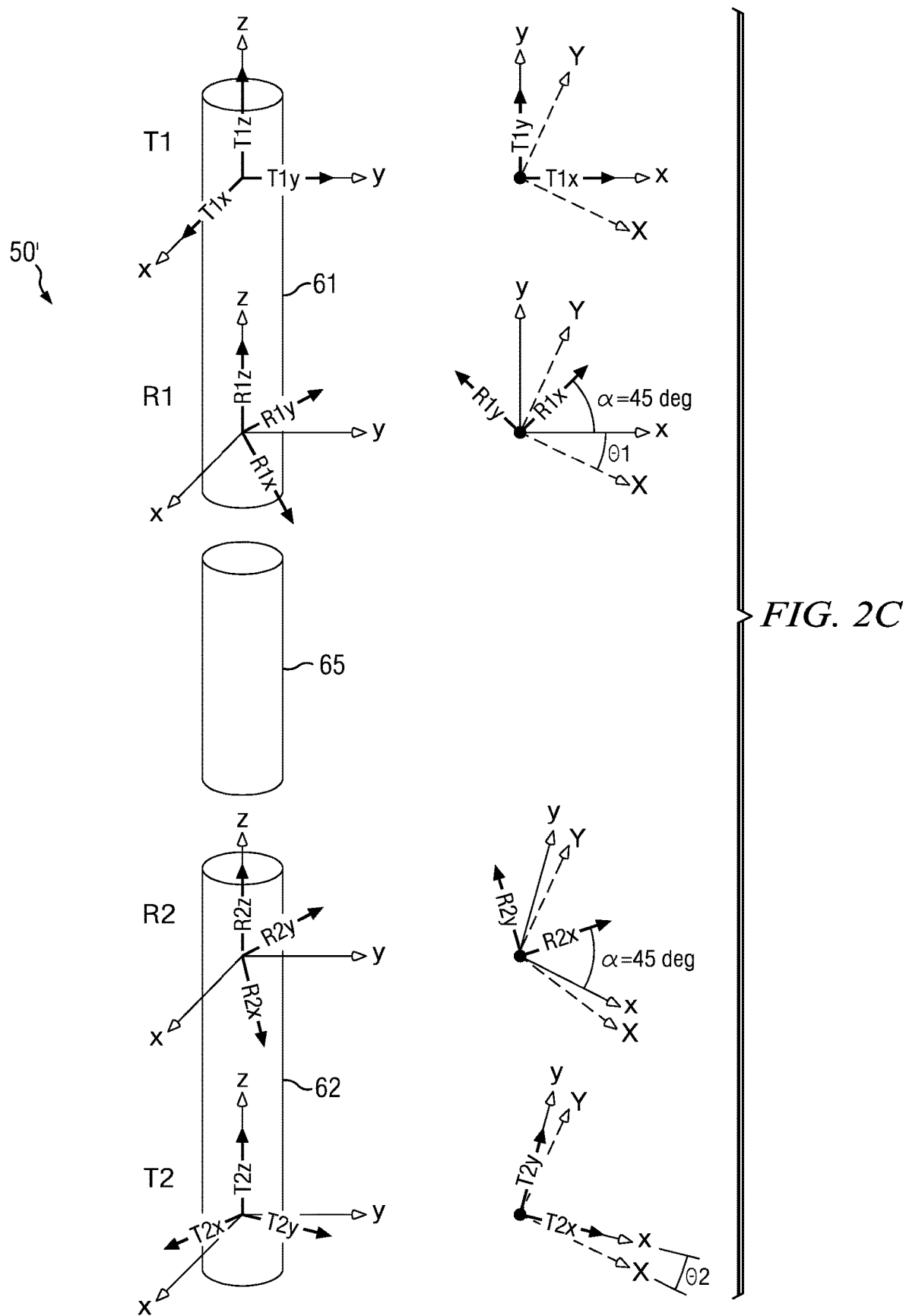
FIG. 2C schematically depicts the antenna moments in an alternative electromagnetic logging tool including triaxial transmitters and receivers.

While not depicted on FIGS. 2A-2C, it will be understood that one or more of the transmitters 52 and 54 and the receivers 56 and 58 may include a tilted antenna. Tilted antennas are commonly used to make directional resistivity measurements. As is known to those of ordinary skill in the art, a tilted antenna is one whose moment is angularly offset (tilted) with respect to the tool axis and is neither parallel with nor orthogonal to the tool axis.

FIG. 2B depicts the moments (magnetic dipoles) of one embodiment of measurement tool 50 in which the transmitters 52, 54 and receivers 56, 58 each include a tri-axial antenna arrangement. Each of the transmitters 52, 54 includes an axial transmitting antenna $T1_z$ and $T2_z$ and first and second transverse transmitting antennas $T1_x$, $T1_y$ and $T2_x$, $T2_y$. Likewise, each of the receivers 56, 58 includes an axial receiving antenna $R1_z$ and $R2_z$ and first and second transverse receiving antennas $R1_x$, $R1_y$ and $R2_x$, $R2_y$. It will be understood that the disclosed embodiments are not limited to a tri-axial antenna configuration such as that depicted on FIG. 2B.

FIG. 2C depicts an alternative electromagnetic measurement tool embodiment 50' in which the first and second transmitters are deployed on corresponding first and second subs 61 and 62 that are free to rotate with respect to one another (e.g., in an embodiment in which a drilling motor 65 is deployed therebetween). As in tool embodiment 50, each of the transmitters T1 and T2 and receivers R1 and R1 may include a tri-axial antenna arrangement. In the example embodiment depicted the moment of $R1_z$ is aligned with the moment of $T1_z$ (and the z-azis) while the moments of $R1_x$ and $R1_y$ are rotationally offset from the moments of $T1_x$ and $T1_y$ by an offset angle α (e.g., 45 degrees in the depicted embodiment). The moment of $R2_z$ is aligned with the moment of $T2_z$ while the moments of $R2_x$ and $R2_y$ are rotationally offset from the moments of $T2_x$ and $T2_y$ by α (e.g., 45 degrees). The disclosed embodiments are, of course, not limited in these regards.

As stated above, the first and second subs 61 and 62 may rotate with respect to one another such that the moments of the x- and y-axis transmitting and receiving antennas are misaligned and rotate with respect to one another (i.e., the misalignment angle between the subs varies with time). Using the notation shown on FIG. 2C, at any instant in time, the orientation angle of the x-axis on sub 61 (the $T1_x$ direction) is $\theta_1$ with respect to an arbitrary 'global' (or wellbore) x-direction. Likewise, at the same instant in time, the orientation angle of the x-axis on sub 62 (the $T2_x$ direction) is $\theta_2$ with respect to the global x-direction. It will thus be understood that the moments of the x- and y-transmitting and receiving antennas T1 and T2 and R1 and R2 are misaligned by a misalignment angle $\gamma = \theta_1 \theta_2$. It will be understood that $\theta_1$ and $\theta_2$ may be referred to as toolface angles of the first and second subs in that they define the rotational orientation of the subs with respect to a global reference direction. Since $\theta_1$ and $\theta_2$ are variable with time (owing to the rotation of the subs) and since the subs rotate at different rates the misalignment angle γ also varies with time.

Figure 3:
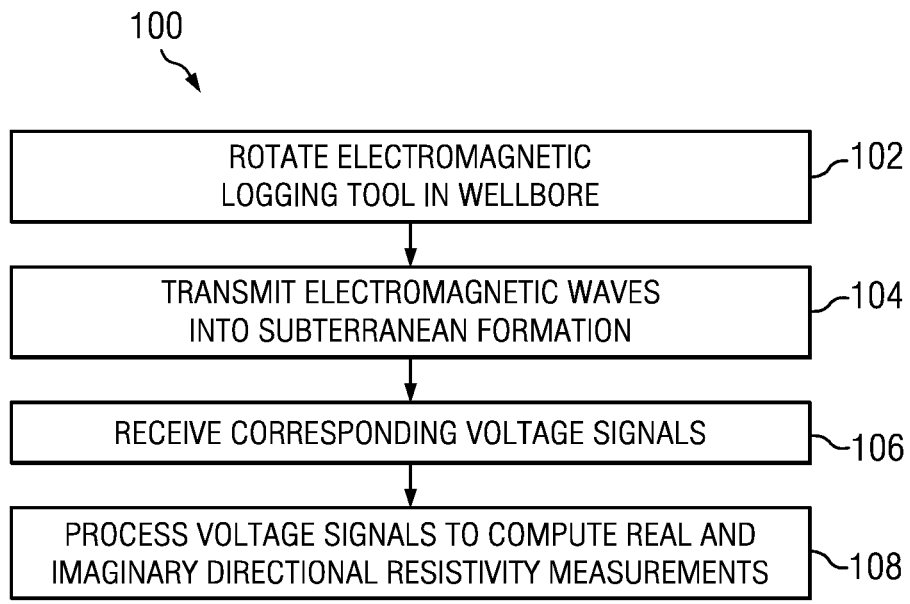
FIG. 3 depicts a flow chart of one disclosed method embodiment for computing real and imaginary gain compensated measurement quantities.

FIG. 3 depicts a flow chart of one disclosed method embodiment 100 for computing real and imaginary measurement quantities. An electromagnetic measurement tool (e.g., one of the measurement tools depicted on FIGS. 2B and 2C) is deployed in and rotated in a subterranean wellbore at 102 (e.g., while drilling the wellbore). One or more transmitters are sequentially fired at 104 thereby transmitting an electromagnetic wave into the subterranean formation while rotating in 102. Voltage signals corresponding to the transmitted electromagnetic waves are received at 106 by a plurality of the receivers. The received voltage signals may then be processed at 108 to compute real and imaginary resistivity measurement components (e.g., real and imaginary gain compensated directional resistivity measurements). These real and imaginary components may then be further processed to compute one or more properties of the subterranean formation.

Figure 4:
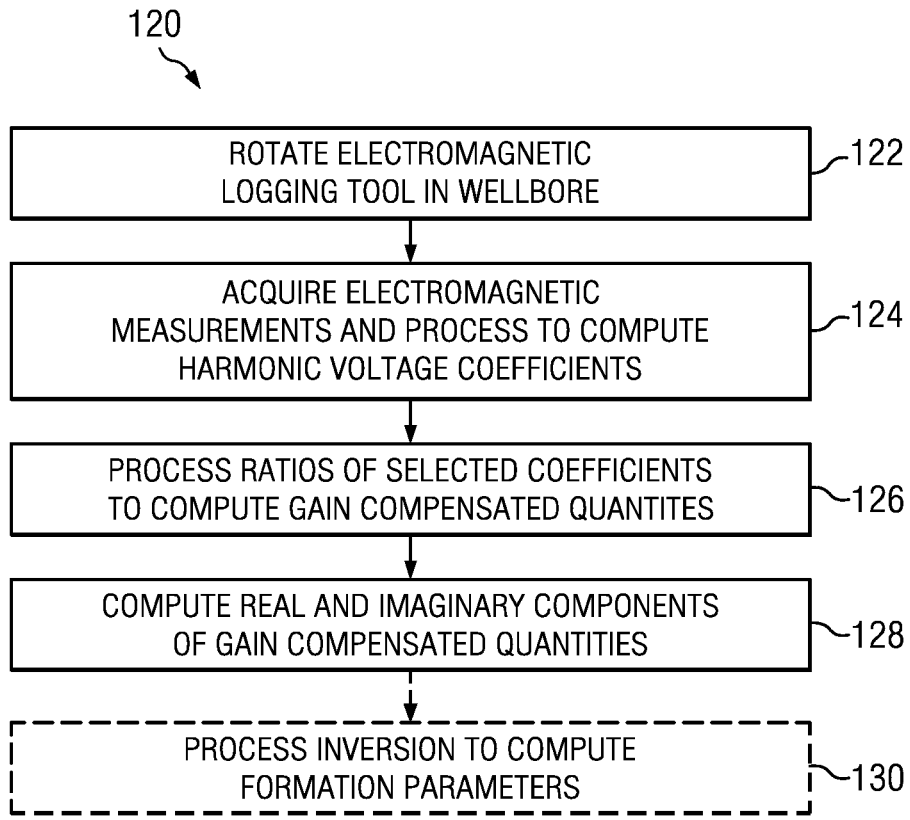
FIG. 4 depicts a flow chart of another disclosed method embodiment for computing real and imaginary gain compensated measurement quantities.

FIG. 4 depicts a flow chart of another disclosed method embodiment 120 for computing real and imaginary gain compensated measurement quantities. An electromagnetic measurement tool (e.g., one of the measurement tools depicted on FIGS. 2B and 2C) is deployed in and rotated in a subterranean wellbore at 122 (e.g., while drilling the wellbore). Electromagnetic measurements are acquired at 124 while the tool is rotating and processed to obtain harmonic voltage coefficients. For example, one or more transmitters may be sequentially fired so as to transmit an electromagnetic wave into the subterranean formation. Corresponding voltage signals may be received by a plurality of the receivers and processed to compute the harmonic voltage coefficients. Ratios of selected harmonic voltage coefficients may then be processed to obtain gain compensated measurement quantities at 126. The gain compensated measurement quantities may then be further processed to compute corresponding real and imaginary components at 128. An inversion may be optionally processed at 130 using the real and imaginary gain compensated measurement quantities to compute one or more formation parameters (e.g., a formation resistivity, a dip angle, a distance to a remote bed boundary, and the like).

With continued reference to FIGS. 3 and 4, and as is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennae may be processed, as is known to those of ordinary skill in the art, to obtain one or more properties of the formation.

In general, earth formations are anisotropic such that their electrical properties may be expressed as a 3×3 tensor that contains information on formation resistivity anisotropy, dip, bed boundaries and other aspects of formation geometry. It will be understood by those of ordinary skill in the art that the mutual couplings between the tri-axial transmitter antennas and the tri-axial receiver antennas depicted on FIGS. 2B and/or 2C form a 3×3 matrix and thus may have sensitivity to a full 3×3 formation impedance tensor. For example, a 3×3 matrix of measured voltages $V_{ij}$ may be expressed as follows:

$$V_{ij} = \begin{bmatrix} V_{ijxx} & V_{ijxy} & V_{ijxz} \\ V_{ijyx} & V_{ijyy} & V_{ijyz} \\ V_{ijzx} & V_{ijzy} & V_{ijzz} \end{bmatrix} = I_i Z_{ij} = \begin{bmatrix} I_{ix} & 0 & 0 \\ 0 & I_{iy} & 0 \\ 0 & 0 & I_{iz} \end{bmatrix} \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (1)$$

where $V_{ij}$ represent the 3×3 matrix of measured voltages with i indicating the corresponding transmitter triad (e.g., T1 or T2) and j indicating the corresponding receiver triad (e.g., R1 or R2), $I_i$ represent the transmitter currents, and $Z_{ij}$ represent the transfer impedances which depend on the electrical and magnetic properties of the environment surrounding the antenna pair in addition to the frequency, geometry, and spacing of the antennas. The third and fourth subscripts indicate the axial orientation of the transmitter and receiver antennas. For example, $V_{12xy}$ represents a voltage measurement on the y-axis antenna of receiver R2 resulting from a firing of the x-axis antenna of transmitter T1.

When bending of the measurement tool is negligible (e.g., less than about 10 degrees), the measured voltages may be modeled mathematically, for example, as follows:

$$V_{ij} = G_{Ti} m_{Ti}{}^t (R_{\theta t}{}^t Z_{ij} R_{\theta r}) m_{Rj} G_{Rj} \quad (2)$$

where $Z_{ij}$ are matrices representing the triaxial tensor couplings (impedances) between the locations of transmitter i and receiver j, $G_{Ti}$ and $G_{Rj}$ are diagonal matrices representing the transmitter and receiver gains, $R_{\theta t}$ and $R_{\theta r}$ represent the rotation matrices for rotating the transmitter and receiver about the z-axis through angles $\theta_t$ and $\theta_r$, $m_{Ti}$ and $m_{Rj}$ represent the matrices of the direction cosines for the transmitter and receiver moments at $\theta=0$, and the superscript t represents the transpose of the corresponding matrix. The matrices in Equation 2 may be given, for example, as follows:

$$Z_{ij} = \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (3)$$

$$G_{Ti} = \begin{bmatrix} g_{Tix} & 0 & 0 \\ 0 & g_{Tiy} & 0 \\ 0 & 0 & g_{Tiz} \end{bmatrix} \quad (4)$$

$$G_{Rj} = \begin{bmatrix} g_{Rjx} & 0 & 0 \\ 0 & g_{Rjy} & 0 \\ 0 & 0 & g_{Rjz} \end{bmatrix} \quad (5)$$

$$R_{\theta t} = \begin{bmatrix} \cos(\theta_t) & \sin(\theta_t) & 0 \\ \sin(\theta_t) & \cos(\theta_t) & 0 \\ 0 & 0 & 1 \end{bmatrix} \quad (6)$$

$$R_{\theta r} = \begin{bmatrix} \cos(\theta_r) & \sin(\theta_r) & 0 \\ \sin(\theta_r) & \cos(\theta_r) & 0 \\ 0 & 0 & 1 \end{bmatrix} \quad (7)$$

Using the T1x antenna direction as a reference direction for the first sub and the T2x antenna direction as a reference direction for the second sub, the matrices of the direction cosines of the transmitter and receiver moments may be given, for example, as follows:

$$m_{T1} = I$$

$$m_{R1} = R_\alpha$$

$$m_{T2} = R_\gamma$$

$$m_{R2} = R_\alpha R_\gamma \quad (8)$$

where I represents the identity matrix, $R_\alpha$ represents the rotation matrix about the z-axis through the angle $\alpha$, and $R_\gamma$ represents the rotation matrix about the z-axis through the angle $\gamma$. It will be understood that Equations 2-8 are written for a general embodiment (such as shown on FIG. 2C) in which the subs 61 and 62 are free to rotate with respect to one another (but are applicable to other configurations).

In an embodiment in which the transmitters and receivers are deployed on a common tool body (such that there is no misalignment as in FIG. 2B) it will be understood that $\theta_t = \theta_r$ such that $V_{ij} = G_{Ti}(R_\theta{}^t Z_{ij} R_\theta) G_{Rj}$. It will be understood that the disclosed embodiments are not limited in regard to the relative rotation of the transmitters and receivers. Gain compensated quantities may be computed with or without relative rotation between the transmitters and receivers. For example, commonly assigned U.S. patent application Ser. No. 14/549,396 (which is fully incorporated by reference herein) discloses methods for obtaining gain compensated measurements with differential rotation of the first transmitter and receiver with respect to the second transmitter and receiver (e.g., in an embodiment similar to that depicted on FIG. 2C). Commonly assigned U.S. patent application Ser. No. 14/325,797 (which is also fully incorporated by reference herein) discloses methods for obtaining compensated measurements in which the transmitters and receivers are rotationally fixed relative to one another (e.g., in an embodiment similar to that depicted on FIG. 2B).

The receiving antenna voltages may be measured while the tool rotates in the borehole. The measured voltages may be expressed mathematically in terms of their harmonic voltage coefficients, for example, as follows thereby enabling harmonic voltage coefficients to be obtained:

$$V_{ij} = V_{DC\_ij} + V_{FHC\_ij}\cos(\theta) + V_{FHS\_ij}\sin(\theta) + V_{SHC\_ij}\cos(2\theta) + V_{SHS\_ij}\sin(2\theta) \quad (9)$$

where $V_{DC\_ij}$ represents a DC voltage coefficient, $V_{FHD\_ij}$ and $V_{FHS\_ij}$ represent first order harmonic cosine and first order harmonic sine voltage coefficients (also referred to herein as first harmonic cosine and first harmonic sine voltage coefficients), and $V_{SHC\_ij}$ and $V_{SHS\_ij}$ represent second order harmonic cosine and second order harmonic sine voltage coefficients (also referred to herein as second harmonic cosine and second harmonic sine voltage coefficients) of the ij transmitter receiver couplings.

It will be understood that collocated tri-axial transmitter and receiver embodiments (e.g., as depicted on FIGS. 2B and 2C) are not required to gain compensate certain of the 3×3 matrix components. For example, the axial cross terms (i.e., the xz, zx, yz, and zy terms) may be gain compensated using any tool embodiment that includes an axial transmitter antenna, a transverse (cross-axial) transmitter antenna, an axial receiver antenna, and a transverse receiver antenna deployed on the tool body. Moreover, the transverse coupling and cross coupling terms (i.e., the xx, yy, xy, and yx terms) may be gain compensated using any tool embodiment including first and second transverse transmitting and receiving antennas. The axial coupling term (i.e., the zz term) may be gain compensated using any tool embodiment including spaced apart axial transmitters and receivers. These transmitter and receiver antennas may be distributed along the tool body with substantially any suitable spacing and order. Moreover, the transmitter antennas and/or the receiver antennas may be collocated (or not).

It will be further understood that tilted antennas may be used to obtain many of the coupling and cross-coupling components described herein. For example, tilted antennas may be readily used to obtain the axial cross terms.

Ratios between the DC xx and yy voltage measurements or the second harmonic xx and yy voltage measurements may optionally be computed and allow a gain ratio of the x to y transmitter and gain ratio of the x to y receiver to be obtained. The voltage measurements may also be rotated mathematically to simulate rotation of the x and y antennas in the R1 and R2 receivers and the T2 transmitter such that they are rotationally aligned with the x and y antennas in the T1 transmitter. Such rotation removes the effect of the offset angle α and misalignment angle γ on the measurements. Such computations are disclosed, for example, in U.S. patent application Ser. No. 14/549,396 which is incorporated by reference herein in its entirety.

The following tensor terms (and terms related to tensor terms) may be obtained from the back rotated coefficients (similar terms may also be obtained in embodiments in which back rotation is unnecessary):

$$ZZ_{ij} \quad V_{DC_{ijzz}} = g_{Tiz}g_{Rjz}Z_{ijzz} \quad (10)$$

$$XZ_{ij} \quad \frac{V_{FHC_{ijxz_{rot}}} + V_{FHS_{ijxz_{rot}}}}{2} = g_{Tix}g_{Rjz}Z_{ijxz} \quad (11)$$

$$YZ_{ij} \quad \frac{V_{FHC_{ijyz_{rot}}} + V_{FHS_{ijyz_{rot}}}}{2} = g_{Tiy}g_{Rjz}Z_{ijyz} \quad (12)$$

$$ZX_{ij} \quad \frac{V_{FHC\_ijzx\_rot} + V_{FHS\_ijzx\_rot}}{2} = g_{Tiz}g_{Rjx}Z_{ijzx} \quad (13)$$

$$ZY_{ij} \quad \frac{V_{FHC\_ijzy\_rot} + V_{FHS\_ijzy\_rot}}{2} = g_{Tiz}g_{Rjx}Z_{ijzy} \quad (14)$$

$$XXplusYY_{ij} \quad \frac{V_{DC\_ijxx\_rot} + V_{DC\_ijyy\_rot}}{2} = g_{Tix}g_{Rjx}\frac{(Z_{ijxx} + Z_{ijyy})}{2} \quad (15)$$

$$XYminusYX_{ij} \quad \frac{V_{DC\_ijxy\_rot} + V_{DC\_ijyx\_rot}}{2} = g_{Tix}g_{Rjx}\frac{(Z_{ijxy} + Z_{ijyx})}{2} \quad (16)$$

$$XXminusYY_{ij} \quad (17)$$

$$\frac{V_{SHC\_ijxx\_rot} + V_{SHC\_ijyy\_rot} + V_{SHS\_ijxx\_rot} - V_{SHS\_ijyy\_rot}}{2} = g_{Tix}g_{Rjx}\frac{(Z_{ijxx} + Z_{ijyy})}{2}$$

$$XYplusYX_{ij} \quad \frac{V_{SHC\_ijxy\_rot} + V_{SHC\_ijyx\_rot} + V_{SHS\_ijxy\_rot} - V_{SHS\_ijyx\_rot}}{2} = g_{Tix}g_{Rjx}\frac{(Z_{ijxy} + Z_{ijyx})}{2} \quad (18)$$

The quantities in Equations 10-18 contain only x and z transmitter and receiver gains. These gains may be canceled out via computing various ones of the following ratios. The following term by term (TBT) compensation operators may be defined for any measurement X obtained between transmitter i and receiver j, for example, as follows:

$$TBT(X) = \sqrt{\frac{X_{ij}}{X_{ii}} \times \frac{X_{ji}}{X_{jj}}} \quad (19)$$

where $X_{ij}$, $X_{ji}$, $X_{ii}$, and $X_{jj}$ may include the measurement terms defined above with respect to FIGS. 10-18 obtained using the i and j transmitter and receiver (e.g., the transmitters and receivers depicted on FIGS. 2A, 2B, and 2C).

Various gain compensated quantities may be computed following the form of Equation 19. For example, only:

$$CXX = \sqrt{\frac{(XXplusYY_{ij} + XXminusYY_{ij})(XXplusYY_{ji} + XXminusYY_{ji})}{(XXplusYY_{ii} + XXminusYY_{ii})(XXplusYY_{jj} + XXminusYY_{jj})}} \quad (20)$$

$$CYY = \sqrt{\frac{(XXplusYY_{ij} - XXminusYY_{ij})(XXplusYY_{ji} - XXminusYY_{ji})}{(XXplusYY_{ii} - XXminusYY_{ii})(XXplusYY_{jj} - XXminusYY_{jj})}} \quad (21)$$

$$CZZ = \sqrt{\frac{(ZZ_{ij})(ZZ_{ji})}{(ZZ_{ii})(ZZ_{jj})}} \quad (22)$$

$$CXXplusYY = \sqrt{\frac{(XXplusYY_{ij})(XXplusYY_{ji})}{(XXplusYY_{ii})(XXplusYY_{jj})}} \quad (23)$$

where CXX, CYY, and CZZ represent gain compensated xx, yy, and zz couplings (the tensor diagonal terms) and CXXplusYY represents a gain compensated quantity related to the sum of the xx and yy couplings. It will be understood that the disclosed embodiments are not limited to the above defined gain compensated measurement quantities. Other suitable gain compensated measurement quantities are disclosed in commonly assigned, co-pending U.S. application Ser. Nos. 14/285,581; 14/285,588; 14/339,959; 14/325,797; and 14/549,396 each of which is incorporated by reference herein in its entirety.

The gain compensated quantities defined above in Equations 20-23 may be further manipulated, for example, to compute the following measurement quantities:

$$UHR = \frac{2(CZZ)}{(CXXplusYY)} \quad (24)$$

$$UHA = \frac{CXX}{CYY} \quad (25)$$

$$CS = \sqrt{R_{xz} + R_{zx} \text{ scale}(R1_{xzzx} + R2_{xzzx})} \quad (26)$$

$$CA = \sqrt{R_{xz} + R_{zx} + \text{scale}(R1_{xzzx} + R2_{xzzx})} \quad (27)$$

where UHR and UHA represent gain compensated harmonic resistivity and harmonic anisotropy measurements and CS and CA represent gain compensated symmetrized and antisymmetrized measurement quantities, and where:

$$R_{zx} = \frac{V_{FHC\_ijzx} \cdot V_{FHC\_jixz}}{V_{DC\_jjxx} \cdot V_{DC\_iizz}}$$

$$R_{xz} = \frac{V_{FHC\_ijxz} \cdot V_{FHC\_jizx}}{V_{DC\_iixx} \cdot V_{DC\_jjzz}}$$

$$R1_{xzzx} = \frac{V_{FHC\_ijxz} \cdot V_{FHC\_jizx}}{V_{DC\_ijxx} \cdot V_{DC\_ijzz}}$$

$$R2_{xzzx} = \frac{V_{FHC\_jizx} \cdot V_{FHC\_jixz}}{V_{DC\_jixx} \cdot V_{DC\_jizz}}$$

$$\text{scale} = \sqrt{\frac{V_{DC\_ijzz} V_{DC\_jizz} V_{DC\_ijxx} V_{DC\_jixx}}{V_{DC\_iizz} V_{DC\_jjzz} V_{DC\_iixx} V_{DC\_jjxx}}}$$

It will be appreciated that the gain compensated measurement quantities described above with respect to Equations 20-27 are complex quantities and that these quantities may be represented as a corresponding attenuation and phase shift, for example, as follows:

$$ATT = 20\log_{10}(CQ) \quad (28)$$

$$PS = \frac{180}{\pi}\text{angle}(CQ)$$

where CQ represents the compensated quantity, for example, from Equations 20-27 and ATT and PS represent the attenuation and phase shift of the complex quantity.

While the above described compensated measurement quantities have wide potential applicability in electromagnetic logging operations, one aspect of the present disclosure was the realization that the accuracy of the attenuation and phase shift measurements can be questionable in certain noisy operating conditions. It was further realized that real and imaginary measurement quantities tend to be significantly more robust under the same noisy conditions. These features are described in more detail below with respect to the computational examples.

With reference again to FIG. 4, the real and imaginary components of the compensated measurement quantities may be computed, for example, as follows:

$$RCQ = \text{Real}(CQ)$$

$$ICQ = \text{Imag}(CQ) \quad (29)$$

where RCQ and ICQ represent the real and imaginary components of the gain compensated measurement quantities.

In one particular embodiment, a complex geometric mean is computed to construct gain compensated xz and zx couplings. These may be obtained from $R_{zx}$ and $R_{xz}$ (which are also listed above), for example, as follows:

$$R_{zx} = \frac{V_{FHC\_ijzx}}{V_{DC\_jjxx}} \cdot \frac{V_{FHC\_jixz}}{V_{DC\_iizz}} = zx1 \cdot zx2 \quad (30)$$

$$R_{xz} = \frac{V_{FHC\_ijxz}}{V_{DC\_iixx}} \cdot \frac{V_{FHC\_jizx}}{V_{DC\_jjzz}} = xz1 \cdot xz2$$

The average phase angle may be obtained from $R_{zx}$ and $R_{xz}$, for example, as follows:

$$\varphi_{zx} = (\varphi_{zx1} + \varphi_{zx2})/2$$

$$\varphi_{xz} = (\varphi_{xz1} + \varphi_{xz2})/2 \quad (31)$$

where $\varphi_{zx}$ and $\varphi_{xz}$ represent the average phase angles of the quantities $R_{zx}$ and $R_{xz}$ and $\varphi_{zx1}$, $\varphi_{zx2}$, $\varphi_{xz1}$, and $\varphi_{xz2}$ represent the phase angles of the zx1, zx2, xz1, and xz2 ratios listed in Equation 30. The phase angles $\varphi_{zx1}$, $\varphi_{zx2}$, $\varphi_{xz1}$, and $\varphi_{xz2}$ may be computed, for example, as follows:

$$\varphi_{zx1} = \text{unwrap}[\text{angle}(zx1) + s\ ift]$$

$$\varphi_{zx2} = \text{unwrap}[\text{angle}(zx2) s\ ift]$$

$$\varphi_{xz1} = \text{unwrap}[\text{angle}(xz1) + s\ ift]$$

$$\varphi_{xz2} = \text{unwrap}[\text{angle}(xz2) s\ ift] \quad (32)$$

where unwrap[·] corrects a radian phase angle by adding multiples ±2π as necessary, angle(·) computes the phase angle of a complex quantity, and s ift represents an arbitrary phase shift (75 degrees was used in the examples that follow). Upon computing the average phase angles (in Equation 31), compensated zx and xz cross couplings may be constructed, for example, as follows:

$$C_{ZX} = \sqrt{|R_{zx}|} e^{i\varphi_{zx}}$$

$$C_{XZ} = \sqrt{|R_{xz}|} e^{i\varphi_{xz}} \quad (33)$$

where $C_{ZX}$ and $C_{XZ}$ represent the compensated zx and xz cross couplings and $|R_{zx}|$ and $|R_{xz}|$ represent the magnitudes of $R_{zx}$ and $R_{xz}$ given in Equation 30. $C_{ZY}$ and $C_{YZ}$, representing compensated zy and yz cross couplings, may be computed similarly, for example, as follows:

$$C_{ZY} = \sqrt{|R_{ZY}|} e^{i\varphi_{zy}}$$

$$C_{YZ} = \sqrt{|R_{YZ}|} e^{i\varphi_{yz}} \quad (34)$$

where:

$\varphi_{zy} = (\varphi_{zy1} + \varphi_{zy2})/2$; $\varphi_{yz} = (\varphi_{yz1} + \varphi_{yz2})/2$ $\varphi_{zy1} = \text{unwrap}[\text{angle}(zy1) + s\ ift]$; $\varphi_{yz1} = \text{unwrap}[\text{angle}(yz1) + s\ ift]$ $\varphi_{zy2} = \text{unwrap}[\text{angle}(zy2)\ s\ ift]$; $\varphi_{yz2} = \text{unwrap}[\text{angle}(yz2)\ s\ ift]$ Compensated symmetrized and antisymmetrized measurement quantities may then be computed from the compensated cross coupling components in Equations 33 and 34, for example, as follows:

$$C_{SX} = C_{ZX} C_{XZ}$$

$$C_{SY} = C_{ZY} C_{YZ}$$

$$C_{AX} = C_{ZX} + C_{XZ}$$

$$C_{AY} = C_{ZY} + C_{YZ} \quad (35)$$

where $C_{SX}$ and $C_{SY}$ represent the compensated symmetrized x and y-axis quantities and $C_{AX}$ and $C_{AY}$ represent the compensated antisymmetrized x and y-axis quantities. The real and imaginary components of these complex quantities may then be computed, for example, as follows:

$$R_{CSX} = \text{real}(C_{SX}), I_{CSX} = \text{imag}(C_{SX})$$

$$R_{CSY} = \text{real}(C_{SY}), I_{CSY} = \text{imag}(C_{SY})$$

$$R_{CAX} = \text{real}(C_{AX}), I_{CAX} = \text{imag}(C_{AX})$$

$$R_{CAY} = \text{real}(C_{AY}), I_{CAY} = \text{imag}(C_{AY}) \tag{36}$$

The disclosed embodiments are now described in further detail with respect to the following non-limiting examples in FIGS. 5A-12B. These examples are analytical (mathematical) and were computed using software code developed based on a point dipole model. In each example, a tool model configuration similar to that shown on FIG. 2B was used in which receivers R1 and R2, and transmitter T2 were located 7, 63, and 70 feet above transmitter T1. A two-layer formation model was used in which the upper bed had a horizontal resistivity of 1 ohm.m and a vertical resistivity of 1 ohm.m and the lower bed had a horizontal resistivity of 200 ohm.m and a vertical resistivity of 200 ohm.m. Zero depth was defined as the depth at which the transmitter T1 crossed the bed boundary. The apparent dip angle between the bed boundary and the tool axis was 70 degrees.

In each example, the gain compensated measurement quantity of interest was simulated using three distinct error conditions; (i) no error, (ii) systematic mismatch error including ±10% gain and ±30% phase variation, and (iii) incoherent random noise error in which incoherent random noise including ±10% gain and ±30% phase variation was added to every dimension including depth points and toolface angles.

FIGS. 5A and 5B depict harmonic resistivity attenuation (FIG. 5A) and phase shift (FIG. 5B) measurements computed using Equations 24 and 28. The simulation including systematic mismatch error (circles) perfectly overlaps the simulation with no error (solid line). The incoherent random noise (squares) causes scatter, however, the features related to the boundary are retained in both attenuation and phase shift.

FIGS. 6A and 6B depict harmonic anisotropy attenuation (FIG. 6A) and phase shift (FIG. 6B) measurements computed using Equations 25 and 28. The simulation including systematic mismatch error (circles) perfectly overlaps the simulation with no error (solid line). The incoherent random noise (squares) causes significant scatter, however, the features related to the boundary are retained in both attenuation and phase shift.

Figure 7A:
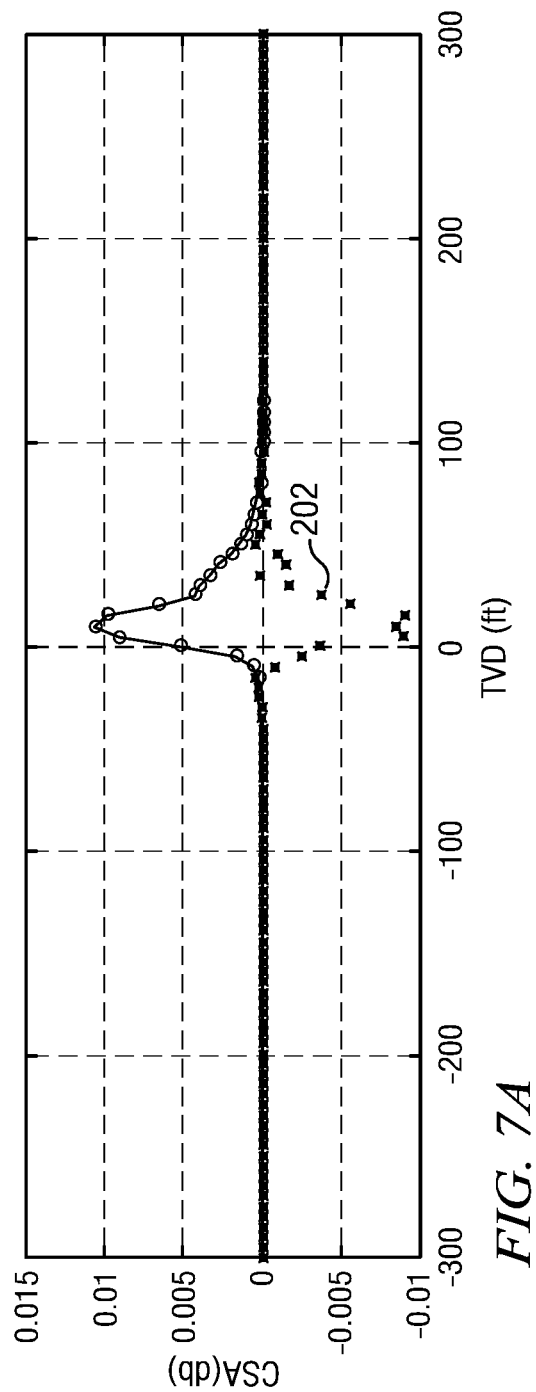
FIGS. 7A and 7B depict compensated symmetrized attenuation (FIG. 7A) and phase shift (FIG. 7B) measurements computed using Equations 26 and 28.
Figure 7B:
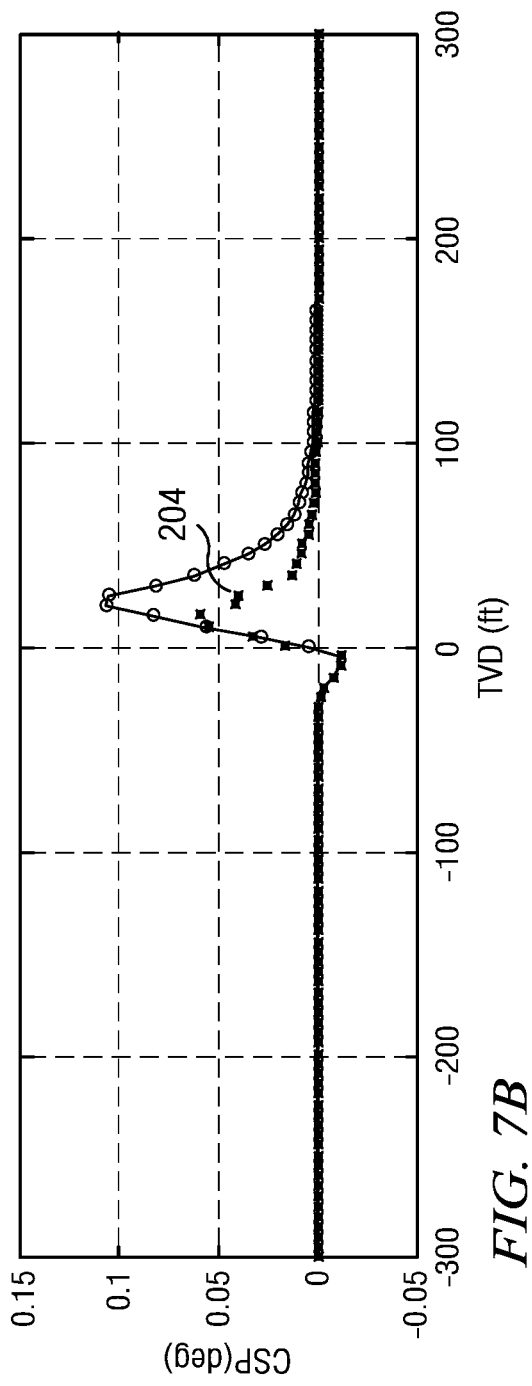

FIGS. 7A and 7B depict compensated symmetrized attenuation (FIG. 7A) and phase shift (FIG. 7B) measurements computed using Equations 26 and 28. The simulation including systematic mismatch error (circles) perfectly overlaps the simulation with no error (solid line). The simulation including incoherent random noise (squares) perfectly overlaps the other simulations except in the boundary region. A sign error is evident in the attenuation simulation as depicted at 202 (the incoherent random noise causes negative attenuation near the boundary). An amplitude mismatch is also evident in the phase shift simulation as depicted at 204 (the incoherent random noise causes about a 50% reduction in the peak phase shift near the boundary).

Figure 8A:
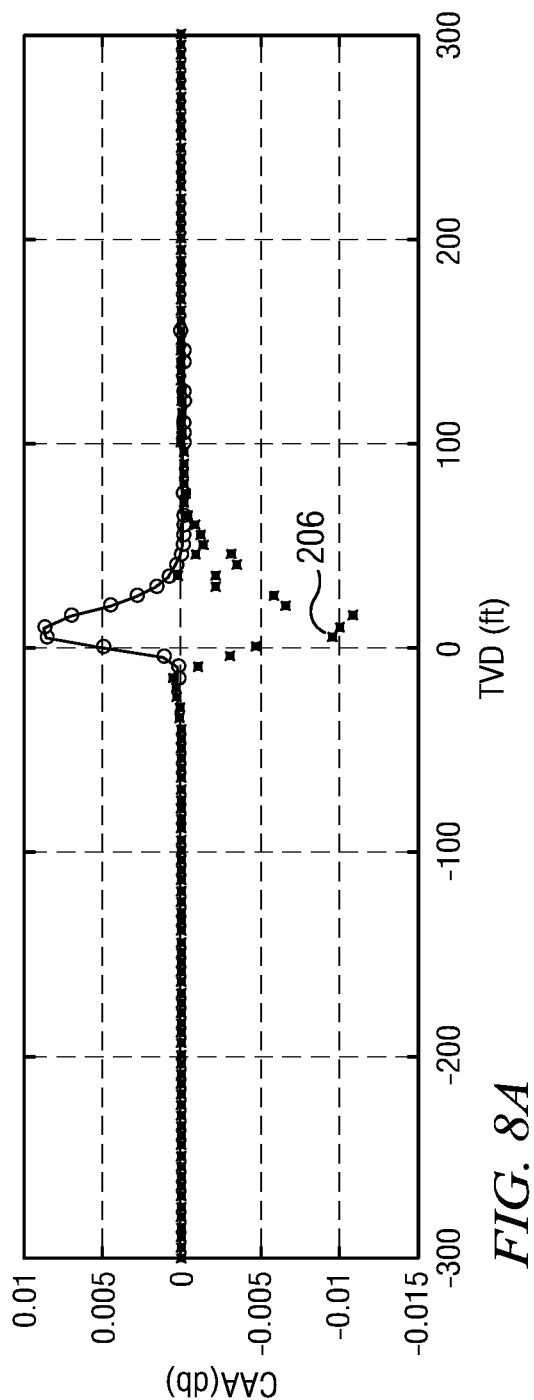
FIGS. 8A and 8B depict compensated antisymmetrized attenuation (FIG. 8A) and phase shift (FIG. 8B) measurements computed using Equations 27 and 28.
Figure 8B:
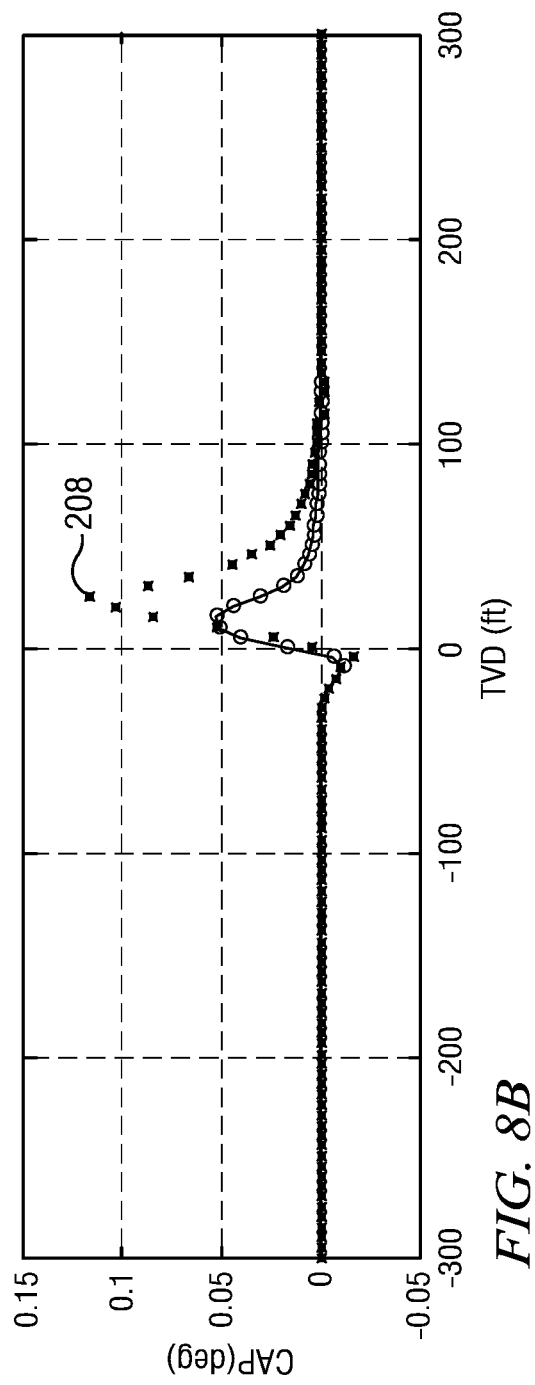

FIGS. 8A and 8B depict compensated antisymmetrized attenuation (FIG. 8A) and phase shift (FIG. 8B) measurements computed using Equations 27 and 28. The simulation including systematic mismatch error (circles) perfectly overlaps the simulation with no error (solid line). The simulation including incoherent random noise (squares) perfectly overlaps the other simulations except in the boundary region. A sign error is again evident in the attenuation simulation as depicted at 206 (the incoherent random noise causes negative attenuation near the boundary). An amplitude mismatch is also evident in the phase shift simulation as depicted at 208 (the incoherent random noise causes about a 100% increase in the peak phase shift near the boundary).

Figure 9A:
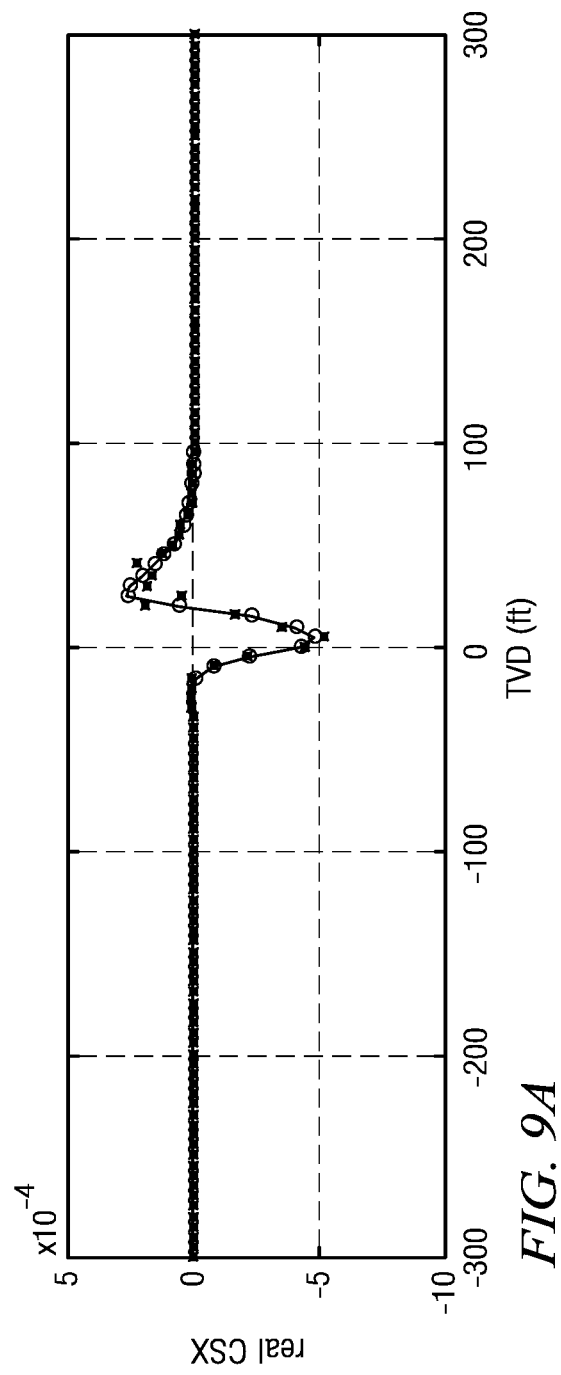
FIGS. 9A and 9B depict compensated real symmetrized $R_{CSX}$ (FIG. 9A) and imaginary symmetrized $I_{CSX}$ (FIG. 9B) measurements computed using Equations 30-33 and 35-36.
Figure 9B:
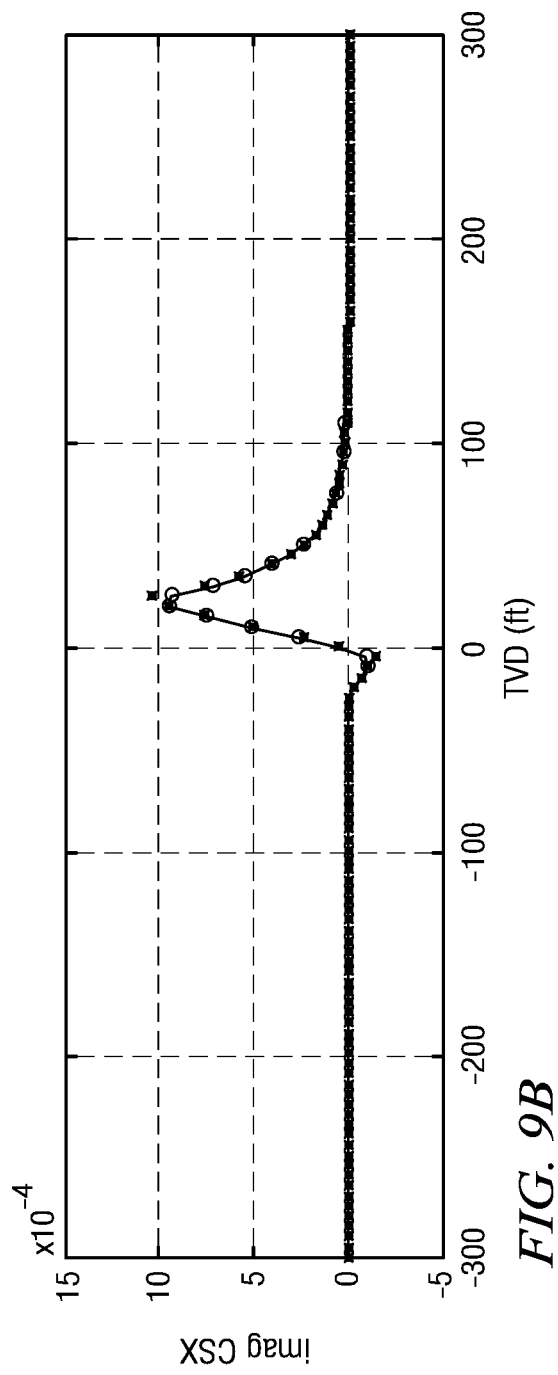

FIGS. 9A and 9B depict compensated real symmetrized $R_{CSX}$ (FIG. 9A) and imaginary symmetrized $I_{CSX}$ (FIG. 9B) measurements computed using Equations 30-33 and 35-36. The simulations including systematic mismatch error (circles) perfectly overlaps the simulation with no error (solid line). Moreover, the simulation including incoherent random noise (squares) also nearly perfectly overlaps the other simulations with no sign errors or magnitude mismatch at the boundary. These simulations were generated using the same data used to generated the simulation in FIGS. 7A and 7B and indicate that the use of the real and imaginary components of the compensated symmetrized measurements tend to be highly robust in the presence of incoherent random noise.

Figure 10A:
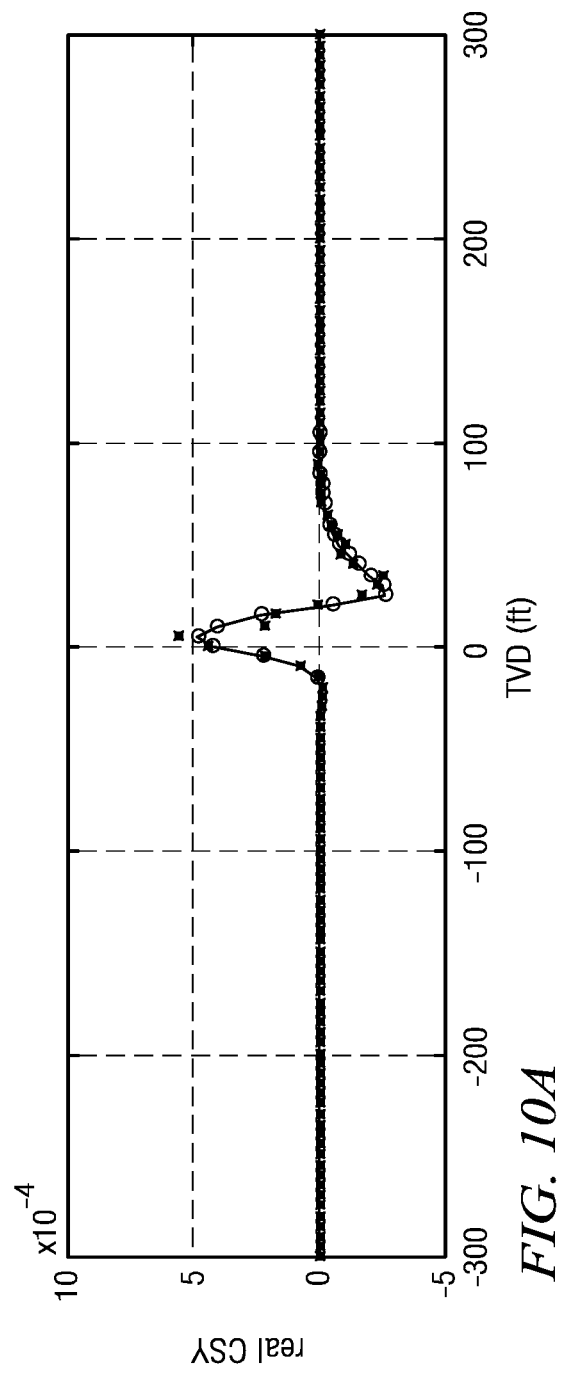
FIGS. 10A and 10B depict compensated real symmetrized $R_{CSY}$ (FIG. 10A) and imaginary symmetrized $I_{CSY}$ (FIG. 10B) measurements computed using Equation 34.
Figure 10B:
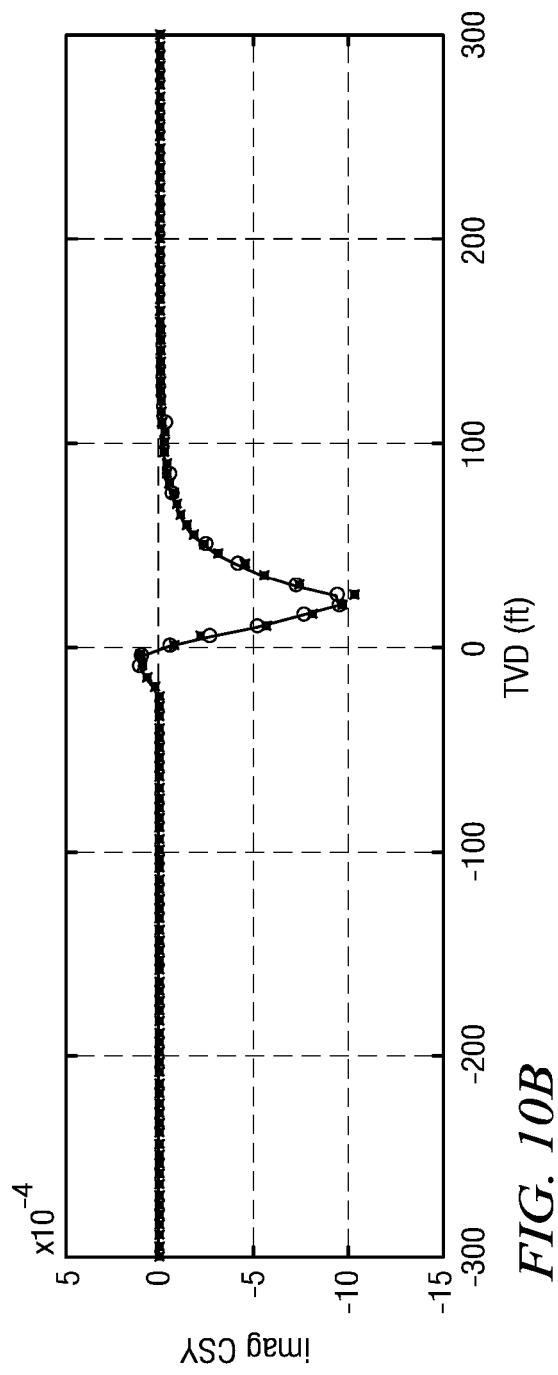

FIGS. 10A and 10B depict compensated real symmetrized $R_{CSY}$ (FIG. 10A) and imaginary symmetrized $I_{CSY}$ (FIG. 10B) measurements computed using Equation 34. The simulations including systematic mismatch error (circles) perfectly overlaps the simulation with no error (solid line). Moreover, the simulation including incoherent random noise (squares) also nearly perfectly overlaps the other simulations with no sign errors or magnitude mismatch at the boundary. These simulations were generated using the same data was used to generated the simulation in FIGS. 7A and 7B and indicate that the use of the real and imaginary components of the compensated symmetrized measurements tend to be highly robust in the presence of incoherent random noise.

Figure 11A:
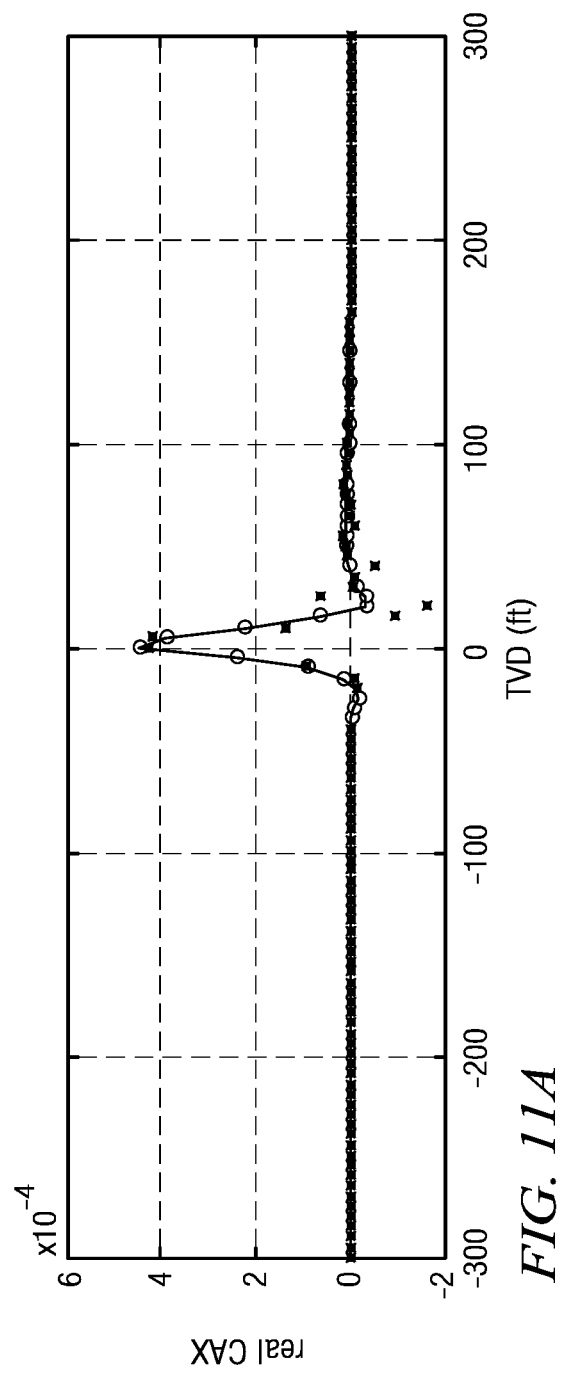
FIGS. 11A and 11B depict compensated real antisymmetrized $R_{CAX}$ (FIG. 11A) and imaginary antisymmetrized $I_{CAX}$ (FIG. 11B) measurements computed using Equations 30-33 and 35-36.
Figure 11B:
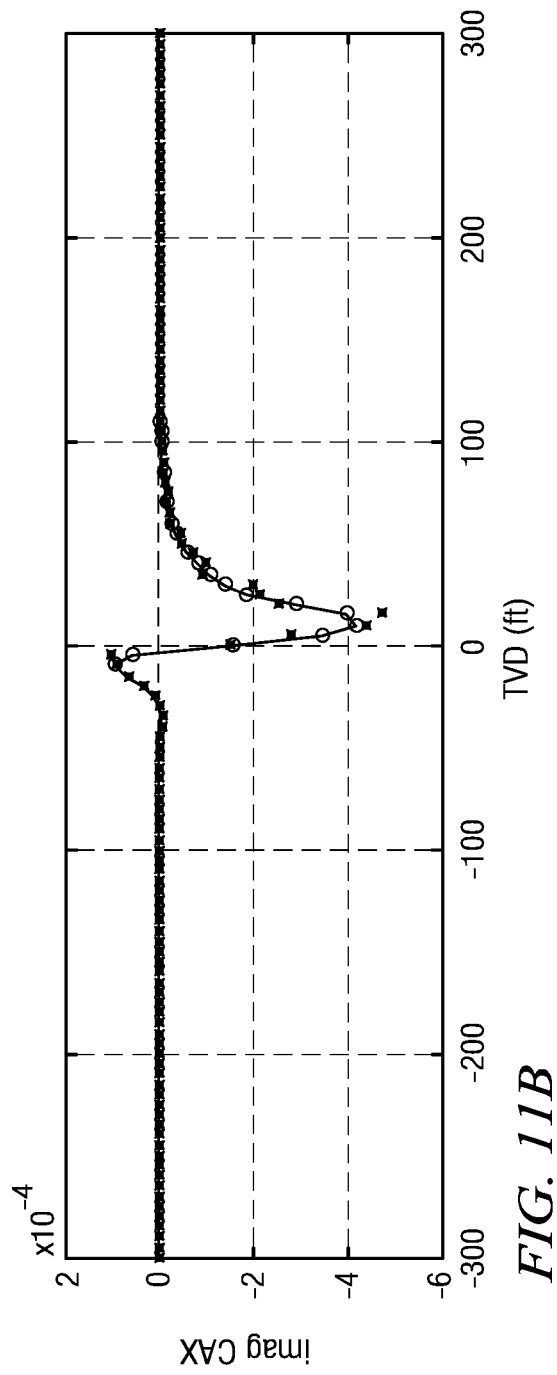

FIGS. 11A and 11B depict compensated real antisymmetrized $R_{CAX}$ (FIG. 11A) and imaginary symmetrized $I_{CAX}$ (FIG. 11B) measurements computed using Equations 30-33 and 35-36. The simulations including systematic mismatch error (circles) perfectly overlaps the simulation with no error (solid line). Moreover, the simulation including incoherent random noise (squares) also nearly perfectly overlaps the other simulations with no sign errors or magnitude mismatch at the boundary. These simulations were generated using the same data used to generated the simulation in FIGS. 8A and 8B and indicate that the use of the real and imaginary components of the compensated symmetrized measurements tend to be highly robust in the presence of incoherent random noise.

Figure 12A:
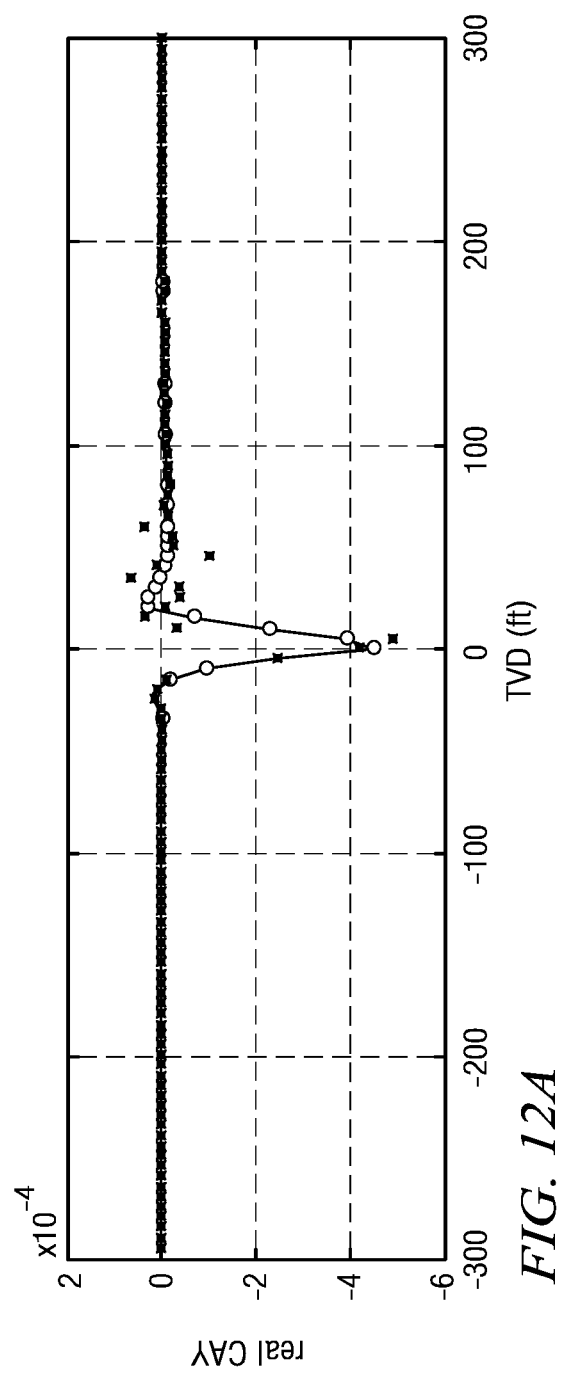
FIGS. 12A and 12B depict compensated real antisymmetrized $R_{CAY}$ (FIG. 12A) and imaginary antisymmetrized $I_{CAY}$ (FIG. 12B) measurements computed using Equation 34.
Figure 12B:
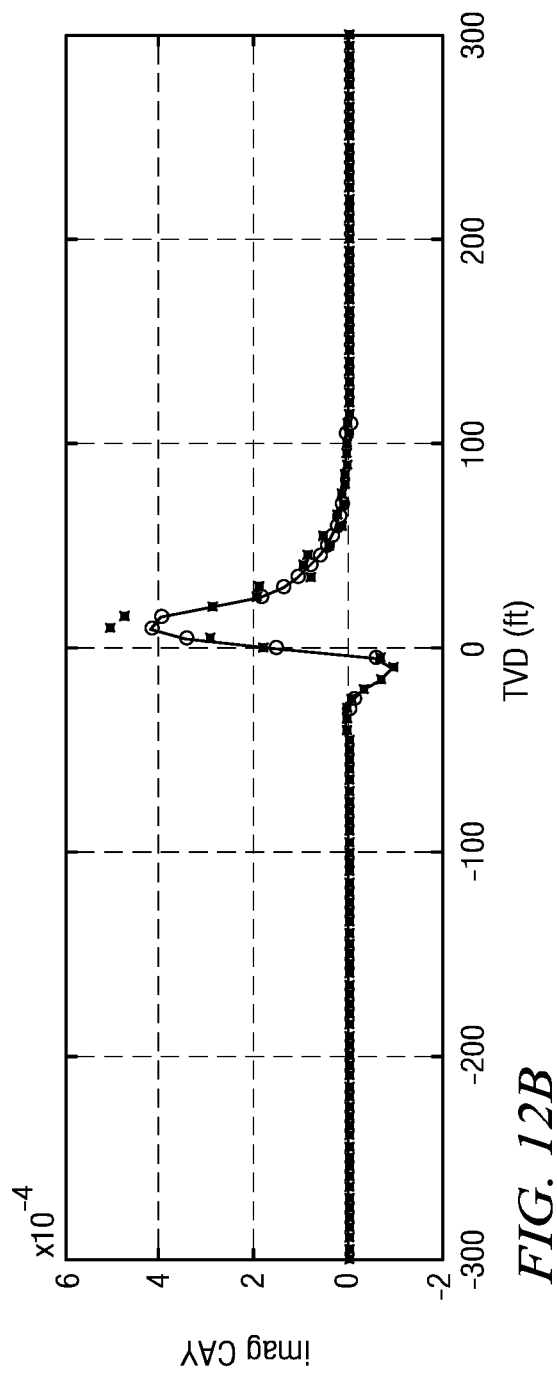

FIGS. 12A and 12B depict compensated real antisymmetrized $R_{CAY}$ (FIG. 12A) and imaginary symmetrized $I_{CAY}$ (FIG. 12B) measurements computed using Equation 34. The simulations including systematic mismatch error (circles) perfectly overlaps the simulation with no error (solid line). Moreover, the simulation including incoherent random noise (squares) also nearly perfectly overlaps the other simulations with no sign errors or magnitude mismatch at the boundary. These simulations were generated using the same data was used to generated the simulation in FIGS. 8A and 8B and indicate that the use of the real and imaginary components of the compensated symmetrized measurements tend to be highly robust in the presence of incoherent random noise.

It will be understood that the various methods disclosed herein for computing real and imaginary gain compensated measurement quantities may be implemented on a on a downhole processor. By downhole processor it is meant an electronic processor (e.g., a microprocessor or digital controller) deployed in the drill string (e.g., in the electromagnetic logging tool or elsewhere in the BHA). In such embodiments, the computed quantities may be stored in downhole memory and/or transmitted to the surface while drilling via known telemetry techniques (e.g., mud pulse telemetry or wired drill pipe). Whether transmitted to the surface or computed at the surface, the quantities may then be utilized in an inversion process (along with a formation model) to obtain various formation parameters as described above.

Although methods for making real and imaginary gain compensated electromagnetic logging measurements have been described in detail, it should be understood that various changes, substitutions and alternations can be made herein without departing from the spirit and scope of the disclosure as defined by the appended claims.

What is claimed is:

1. A method for making gain compensated electromagnetic logging measurements of a subterranean formation, the method comprising
   (a) rotating an electromagnetic logging tool in a subterranean wellbore, the logging tool including a transmitter axially spaced apart from a receiver, the transmitter including at least one transmitting antenna comprising at least one axial transmitting antenna and at least one transverse transmitting antenna, the receiver including at least one receiving antenna comprising at least one axial receiving antenna and at least one transverse receiving antenna;
   (b) causing the at least one transmitting antenna to transmit electromagnetic waves into the subterranean formation;
   (c) using the at least one receiving antenna to receive voltage measurements corresponding to the electromagnetic waves transmitted in (b);
   (d) processing the voltage measurements received in (c) to compute harmonic voltage coefficients;
   (e) processing ratios of selected ones of the harmonic voltage coefficients to compute a gain compensated measurement quantity; and
   (f) processing the gain compensated measurement quantity to compute real and imaginary directional resistivity measurements.

2. The method of claim 1, further comprising:
   (e) processing a mathematical inversion using the real and imaginary directional resistivity measurements to compute at least one property of the subterranean formation.

3. A method for making gain compensated electromagnetic logging measurements of a subterranean formation, the method comprising
   (a) rotating an electromagnetic logging tool in a subterranean wellbore, the logging tool including a transmitter axially spaced apart from a receiver, the transmitter including an axial transmitting antenna and at least one transverse transmitting antenna, the receiver including an axial receiving antenna and at least one transverse receiving antenna;
   (b) causing the axial transmitting antenna and the at least one transverse transmitting antenna to sequentially transmit corresponding electromagnetic waves into the subterranean formation;
   (c) using the axial receiving antenna and the at least one transverse receiving antenna to receive voltage measurements corresponding to the electromagnetic waves transmitted in (b); and
   (d) processing the voltage measurements received in (c) to compute harmonic voltage coefficients; and
   (e) processing ratios of selected ones of the harmonic voltage coefficients computed in (d) to compute real and imaginary components of a gain compensated measurement quantity.

4. The method of claim 3, wherein the real and imaginary components of a gain compensated measurement quantity computed in (e) comprise real and imaginary components of at least one of a symmetrized and an antisymmetrized gain compensated measurement quantity.

5. The method of claim 4, wherein (e) further comprises:
   (i) processing a first average phase angle from first and second ratios of selected ones of the harmonic voltage coefficients;
   (ii) processing a second average phase angle from third and fourth ratios of selected ones of the harmonic voltage coefficients;
   (iii) processing the first and second average phase angles to compute corresponding first and second gain compensated axial cross couplings; and
   (iv) processing the first and second gain compensated axial cross couplings to compute the real and imaginary components of the at least one of a symmetrized and an antisymmetrized gain compensated measurement quantity.

6. The method of claim 5, wherein the real and imaginary components of the symmetrized gain compensated measurement quantity are computed from a difference between the first and second gain compensated axial cross couplings.

7. The method of claim 5, wherein the real and imaginary components of the antisymmetrized gain compensated measurement quantity are computed from a sum of the first and second gain compensated axial cross couplings.

8. The method of claim 5, wherein the first and second average phase angles are computed using the following mathematical equations:

$$\varphi_{zx}=(\varphi_{zx1}+\varphi_{zx2})/2$$

$$\varphi_{xz1}=(\varphi_{xz1}+\varphi_{xz2})/2$$

$$\varphi_{zx1}=\text{unwrap}[\text{angle}(zx1)+\text{shift}]$$

$$\varphi_{xz1}=\text{unwrap}[\text{angle}(xz1)+\text{shift}]$$

$$\varphi_{zx2}=\text{unwrap}[\text{angle}(zx2)-\text{shift}]$$

$$\varphi_{xz2}=\text{unwrap}[\text{angle}(xz2)-\text{shift}]$$

wherein $\varphi_{zx}$ and $\varphi_{xz}$ represent the first and second average phase angles and $\varphi_{zx1}$, $\varphi_{zx2}$, $\varphi_{xz1}$, and $\varphi_{xz2}$ represent the first, second, third, and fourth ratios.

9. The method of claim 5, wherein the first and second gain compensated axial cross couplings are computed using the following equations:

$$C_{ZX}=\sqrt{|R_{zx}|}\cdot e^{i\varphi_{zx}}$$

$$C_{XZ}=\sqrt{|R_{xz}|}\cdot e^{i\varphi_{xz}}$$

wherein $C_{ZX}$ and $C_{XZ}$ represent the first and second gain compensated axial cross couplings, $R_{zx}$ represents a product of the first and second ratios, $R_{xz}$ represents a product of the third and fourth ratios, and $\varphi_{zx}$ and $\varphi_{xz}$ represent the first and second average phase angles.

10. The method of claim 5, wherein the real and imaginary components of the symmetrized gain compensated measurement quantity is computed using the following equations:

$$R_{CSX}=\text{real}(C_{ZX}-C_{XZ}), I_{CSX}=\text{imag}(C_{ZX}-C_{XZ})$$

wherein $R_{CSX}$ and $I_{CSX}$ represent the real and imaginary components of the symmetrized gain compensated measurement quantity and $C_{ZX}-C_{XZ}$ represents a difference between the first and second gain compensated axial cross couplings.

11. The method of claim 5, wherein the real and imaginary components of the antisymmetrized gain compensated measurement quantity is computed using the following equations:

$$R_{CAX}=\text{real}(C_{ZX}+C_{XZ}), I_{CAX}=\text{imag}(C_{ZX}+C_{XZ})$$

wherein $R_{CAX}$ and $I_{CAX}$ represent the real and imaginary components of the antisymmetrized gain compensated measurement quantity and $C_{ZX}+C_{XZ}$ represents a sum of the first and second gain compensated axial cross couplings.

12. The method of claim 3, further comprising:
(f) processing a mathematical inversion using the real and imaginary components of a gain compensated measurement quantity to compute at least one property of the subterranean formation.

13. A downhole logging while drilling tool comprising:
a logging while drilling tool body;
a transmitter including at least one transmitting antenna deployed on the tool body;
a receiver including at least one receiving antenna deployed on the tool body, the receiver being axially spaced apart from the transmitter;
a controller configured to (i) cause the at least one transmitting antenna to transmit electromagnetic waves; (ii) cause the at least one receiving antenna to receive voltage measurements corresponding to the electromagnetic waves transmitted in (i); (iii) process the voltage measurements received in (ii) to compute harmonic voltage coefficients; (iv) process ratios of selected ones of the harmonic voltage coefficients to compute a gain compensated measurement quantity; and (v) process the gain compensated quantity to compute real and imaginary directional resistivity measurements.

14. The downhole logging while drilling tool of claim 13, wherein the at least one transmitting antenna comprises at least one axial transmitting antenna and at least one transverse transmitting antenna.

15. The downhole logging while drilling tool of claim 13, wherein the real and imaginary components of the gain compensated measurement quantity computed in (v) comprises real and imaginary components of at least one of a symmetrized and an antisymmetrized gain compensated measurement quantity.

16. The downhole logging while drilling tool of claim 13, wherein the controller is further configured to (vi) process a mathematical inversion using the real and imaginary directional resistivity measurements to compute at least one property of a subterranean formation.

17. The downhole logging while drilling tool of claim 13, wherein (v) further comprises:
(a) processing a first average phase angle from first and second ratios of selected ones of the harmonic voltage coefficients;
(b) processing a second average phase angle from third and fourth ratios of selected ones of the harmonic voltage coefficients;
(c) processing the first and second average phase angles to compute corresponding first and second gain compensated axial cross couplings; and
(d) processing the first and second gain compensated axial cross couplings to compute the real and imaginary components of the at least one of a symmetrized and an antisymmetrized gain compensated measurement quantity.

* * * * *